United States Patent [19]

Kurtgis

[11] Patent Number: 4,477,289
[45] Date of Patent: Oct. 16, 1984

[54] METHOD FOR WASHING VOLTAGE TRANSMISSION LINE INSULATORS

[76] Inventor: Michael P. Kurtgis, 4651 Sheridan St., Hollywood, Fla. 33021

[21] Appl. No.: 400,738

[22] Filed: Jul. 22, 1982

[51] Int. Cl.³ .................................................. B08B 3/02
[52] U.S. Cl. ......................................... 134/34; 134/42; 239/171; 244/136
[58] Field of Search ..................... 134/34, 42; 239/171; 244/136

[56] References Cited

U.S. PATENT DOCUMENTS

| | | | |
|---|---|---|---|
| 3,362,643 | 1/1968 | Larson et al. | 239/171 X |
| 3,494,423 | 2/1970 | Stansbury et al. | 239/171 X |
| 4,090,567 | 5/1978 | Tomlinson | 239/171 X |

FOREIGN PATENT DOCUMENTS

| | | | |
|---|---|---|---|
| 2634985 | 2/1978 | Fed. Rep. of Germany | 239/171 |
| 1405131 | 9/1975 | United Kingdom | 239/171 |

Primary Examiner—Marc L. Caroff
Attorney, Agent, or Firm—Malin, Haley & McHale

[57] ABSTRACT

A system for washing insulating components of high voltage and extra high voltage transmission lines. A helicopter provides an airborne, mobile, ungrounded, integrally bonded platform for a pressurized spray washing apparatus. The ungrounded helicopter hovers adjacent to the high voltage power lines to allow an articulating boom to be positioned to utilize a directed spray to pressure wash contamination from the insulators. A washing fluid tank and pump assembly contained in the helicopter provides high pressure washing fluid to the articulating boom and provides a self-contained system. Electrical bonding between the ungrounded helicopter and all wash apparatus components permits the helicopter to sustain prolonged energized contact with high voltage transmission source without incurring any adverse effect on the transmission line system, the aircraft or operators.

1 Claim, 5 Drawing Figures

METHOD FOR WASHING VOLTAGE TRANSMISSION LINE INSULATORS

BACKGROUND OF THE INVENTION

This invention relates to a system for cleaning the chains of insulation bells which support high voltage power lines. The purpose of these insulation bells is to provide insulation and air-gap distance from the grounded structure which supports the high voltage line and other grounded objects. Natural and man made pollution collects over a period of time on these insulation bells reducing their insulating capacity eventually resulting in a fault discharge from the power line to the supporting structures which will cause a short circuit in the system and result in extensive damage to the components of the system. In order to prevent this fault discharge it is necessary that the insulation bells be cleaned by washing the pollutants from their surface.

Electrical power is provided to the consumer over long distances by the utilization of high voltage lines which have the capacity of carrying voltage varying from 4 kilovolts to 500 kilovolts and above. In order to convey this voltage over long distances it is necessary and economical to utilize high voltage power transmission lines. Due to the diverse distribution of population centers and the relatively remote locations of power generating stations, it is necessary to utilize high capacity power lines in the range of 240-500 kilovolts over long distances.

The standard high voltage A.C. transmission line system will utilize three phases of conductors supported generally parallel to one another, each carrying voltage 120° out of phase to each other.

These high voltage lines are generally supported by structures varying from simple wooden poles with cross bars to extremely tall metal towers. The type of support structure will generally be dictated by many factors including, but not limited to voltage, conductor size, span and terrain. As the demand for electricity over greater distances has increased, the trend has been to the higher capacity power lines of 240 and 500 kilovolts which utilize extremely tall lattice towers or tubular steel structures in excess of 75 feet and may extend up to 300 feet for support. These power line support structures (which shall be referred to as towers hereafter) generally utilize three types of insulating configurations for supporting the conductors. The insulating structures consist of individual porcelain covered discs (referred to as bells) which interconnect to form chains or strings of varying lengths. These insulating strings (as they are commonly referred to) are suspended from the towers either vertically, horizontally or a V-shape formed by two strings. These strings function to provide stand off air gap distances between the high voltage power lines and the tower structure which is grounded. This air gap distance is required to prevent the high power voltage line from arcing to the grounded support structure over the distance provided by the insulated string, this occurrence is referred to as insulator flash-over or just flash-over. Arcing may be a relatively harmless discharge or transfer between two differing ungrounded potentials to equalize the voltage. If neither of the potentials are grounded there is no fault current. This ungrounded discharge between differing potentials will generally not occur unless they are very close together, usually a matter of inches, up to 1.5 feet with extra high voltage lines of 500 kv and above. These types of discharges are generally not hazardous to personnel or structures since minimal current flow occurs.

The more serious and lethal discharge is the fault discharge between differing potentials, one of which is grounded. The fact that one potential is grounded creates a greater stress on the insulating medium, whether it be the insulating string or an air gap to convey the charge of the power line to the grounded object. In order to prevent this type of flash-over a greater distance must be maintained between the differing potentials, as in this case the distance between the power line to any structure or object, whether it be a man, vehicle or the tower that is grounded. These distances have been determined and are utilized in the electrical utility industry as a standard stand-off distance in working with high power electrical lines. Typical values promulgated by OSHA and relied upon by the utilities industry are:

| | | |
|---|---|---|
| 2.1–15 kv | 2'0" | |
| 15.1–35 kv | 2'4" | |
| 46.1–72.5 kv | 3'0" | (high voltage) |
| 72.6–121 kv | 3'4" | (high voltage) |
| 138–145 kv | 3'6" | (high voltage) |
| 230–242 kv | 5' | (high voltage) |
| 500–552 kv | 11' | (extra high voltage) |
| 700–765 kv | 15' | (extra high voltage) |

Insulator strings are utilized to provide the air gap distance required as set forth above. Between the hot end (electrical conductor) of the insulator string and the cold or grounded end of the insulator string attached to the supporting tower there is a gradient of voltage stress. This gradient of voltage stress will exist between the hot end and any grounded object. As the ground object approaches the hot end within a distance less than the flash-over stand off values set forth above the probability of a fault discharge or arcing to ground increases proportionately. The flash-over stand off value set forth above have incorporated in them a certain safety factor and therefore adherence to them will generally insure that such a fault discharge will not occur. However, venturing inside those values will increase the potential for the fault discharge. Another factor which will increase the probability of fault flash-over is the existence of contamination on the insulators. A gradual build up of free air contamination will result in a degrading of the insulating value of the insulator string thereby distorting the voltage gradient and increasing the possibility of fault flash over. Free air contamination includes but is not limited to man made pollution, natural salt, air borne particles, mineral deposits left by rain, acid rain, volcanic ash, and bird droppings. Generally these contaminants are water soluble and carried in the air. Upon contact with the insulator bells they attach and crystalize forming spots of conductivity on the insulators. Rain may act to wash and dissipate these conducting spots but it may also act to form a bridge between them increasing the conductivity of the insulator as a unit. As a result, the flash-over stand-off values are degraded to the point that a fault flash-over may eventually result from the contamination. Contamination will vary according to the geographical and meteorological conditions of the locality.

Utility companies have experienced fault flash-over not only as a result of contamination but also as a result of ground crews inadvertently touching an energized component of the power line or allowing a grounded object to be positioned inside the stand-off value. If a fault flash-over occurs a short circuit may result shutting down the entire power line and damaging the components of the power line requiring extensive repairs. As a result of the shut down from fault flash-overs utility companies have experienced losses of revenues when the power lines were not functioning and have been required to make extensive repairs at great expense and resulting in further delays in return to service of the power line. Since these power lines are many times located in remote areas, access to them both for cleaning and for repair may be very difficult. This is especially true in developing Third World countries. As a result, it has become a requirement of the electrical power companies to take steps to regularly inspect and clean the insulator strings. This cleaning is generally accomplished by a spray wash unit utilizing water as a cleaning medium. This in itself creates problems in that incorrect wetting of the contaminated insulator string will increase the possibility of fault flash over. Another difficulty arises in the fact that the power companies are utilizing higher voltage lines mounted on very tall towers. The cleaning of these insulator strings has been accomplished by ground crews utilizing washing apparatus mounted on booms which are extended up to the insulators or by men mounted on bucket trucks and raised to the vicinity of the insulators and manually operate a washing boom. The greatest danger and obstacle arising in the utilization of these procedures is the fact that the washing boom and bucket trucks are generally grounded structures and therefore the personal operating them must adhere to the flash-over stand-off values set forth above when cleaning energized circuits.

In washing the insulator strings with water certain techniques must be followed to prevent a flash-over which could result in damage to the apparatus and possible injury or death to the operator. First the apparatus must maintain the flash-over stand-off values, i.e. the nozzle or end of the cleaning boom may not approach closer than the flash-over standoff distance without incurring the risk of a flash over to the cleaning boom. Another factor to contend with is the fact that the flash-over stand-off distances must be aggregated between energized phases or sources. If a cleaning boom is ungrounded and the boom touches the energized conductor of a 500 kv transmission line (becomes energized) then no portion of the energized cleaning boom can come within eleven (11) feet of a grounded object or twenty-two feet of an adjacent energized phase without then risking a flash over from the boom to that grounded point or phase. Since each conductor or bundle of conductors is 120° out of phase with every other conductor or bundle it considers the other to be a ground; therefore each phase requires its own individual stand-off distance. Conductors may be situated so that a cleaning boom being extended from the ground to the vicinity of an insulator string which becomes energized by contact with a conductor may risk flash-over from any adjacent phase or grounded object. Due to the height of many of the towers and the arrangement of the phases ground crews experience a great deal of difficulty in positioning the spray nozzle of the cleaning boom adjacent to the insulator string within the parameters of the flash-over distances while efficiently cleaning the strings.

The desired technique is to wash only two or three insulator bells at a time beginning with the bells closest to the hot end. By washing the contamination from the insulators closest to the hot end the insulation capacity of these insulators is improved, the voltage stress is reduced and the risk of flash-over during the washing operation as a result of wetting the contaminated insulator string is lowered. The technique of washing the insulator stringers will be dependent upon many, including the orientation of the string, the direction of the wind and the affect which it has upon the wash spray and the distance which the spray nozzle must stand off from the insulator string. The desired approach is to prevent wetting down the entire string thereby increasing the contamination effect. Wetting of the entire string may result from a broad spray, blow back of the water by the wind or simply gravity causing the water to flow down the string. The closer the spray nozzle may approach the insulator string facilitates control of the wash spray and reduces the possibility of wetting down the string. The ground operated wash booms are restricted in the amount of access which they have to the string, and the increased stand off distance from the string due to the fact that they are grounded objects.

The ground operated wash systems are slow and may be extremely limited by terrain in their access to the transmission towers. Due to the possibility of flash-over while conducting ground mounted washing operations on the insulator strings some power companies have found it prudent to de-energize the line to prevent an inadvertent fault flash-over. By de-energizing the line electrical utility companies may experience a loss of revenue. An example loss of revenues in a typical electrical utility company would be in the shut down of a 240 kv line, the loss of revenue could be approximatley $20,000.00 per hour. In a 10 mile section of 240 kv transmission line there may be 100 towers with three strings per tower, or 300 strings to be washed. A ground crew would require approximately 20 hours in which to wash these strings. This could result in lost revenues in the amount of approximately $400,000.00.

Due to the mobility, speed and washing efficiency of the instant invention the same 300 strings may be washed by it in a total of five hours for a net savings of $300,000 in revenues to the utility company.

The instant invention is an improvement over existing systems and constitutes a vast improvement in the state of the art with regard to mobility, speed, efficiency, safety and cost effectiveness. The instant invention provides for washing of insulators of energized conductors by a wash boom without regard to flash-over stand-off distances permitting improved and efficient washing of the insulators. The use of an airborne platform such as a helicopter provides exceptional mobility to inaccessible components or areas. A hovering airborne platform provides a maneuverability to the system to allow a washing boom to be positioned to provide a more efficient directed and concentrated washing spray. The hovering airborne platform provides an ungrounded platform from which washing operations may be performed generally without regard to flash-over stand-off distances. As long as the platform does not become grounded by contact with a grounded object such as a phase or part of the support structure the platform can even sustain prolonged contact between the energized conductor and the washing boom with minimal current flow. The washing apparatus provides a high pressure, directed, concentrated wash spray to allow efficient washing of two or three bells at a time while minimizing the danger of improperly wetting down the insulator. The spray nozzle provides a spray which contours with the shape of the bells to effectively remove contamination. The high pressure of the spray minimizes blow back of the spray to prevent wetting down the insulator. The length of the spray boom allows it to extend beyond the rotor blast of the helicopter and prevents dispersion of the wash spray. Electro-conductive bonding between the airborne platform and the components of the washing apparatus prevents arcing within the aircraft upon contact with an energized conductor.

SUMMARY OF THE INVENTION

The present invention relates to a new and improved system for airborne washing of insulator strings of energized, or non-energized high-voltage or EHV transmission lines. An ungrounded airborne platform, such as a helicopter, is utilized to support, transport, maneuver and position a pressurized spray apparatus. The pressurized spray apparatus includes a storage tank for the washing fluid, a pump and pump engine to pressurize the washing fluid, an articulating boom assembly for positioning, directing and conveying the pressurized washing fluid and a spray nozzle at the end of the boom to control the spray pattern of the washing fluid onto the insulator strings. The helicopter hovers adjacent to the transmission tower in an ungrounded environment. The articulating boom is positioned as close as possible to the insulator strings generally without regard to the flash-over stand-off distances. A stream of pressurized washing fluid is directed onto the insulator bells to remove the contaminants.

It is a primary objective of this invention to provide an insulator spray washing system that is airborne, rapidly mobile and ungrounded for spray washing insulators of energized or non-energized power transmission lines.

It is yet another objective of this invention to provide an insulator spray washing system which is integrally, and electrically bonded for preventing arcing between differing potentials of the various unground equipment components.

It is another objective of this invention to provide an insulator spray washing system which is capable of being positioned generally stationary in the vicinity of energized voltage transmission lines.

Another objective of this invention is to provide an insulator spray washing system which may be manipulated into a position to direct a concentrated spray on components of the energized voltage transmission lines.

An additional objective of this invention is to provide an insulator spray washing system which can deliver a controlled, concentrated, pressurized spray of fluid onto the transmission line components to wash away contaminants.

Yet another objective of this invention is to provide an insulator spray washing system which is ungrounded and can sustain being energized by contact with the electrified transmission line or its components.

Still another objective of this invention is to provide an insulator spray washing system capable of access to remote and rugged terrain locations.

Still another objective of this invention is to provide an insulator spray washing system of high mobility for rapid washing operations over long distances.

Yet another objective of this invention is to provide an insulator spray washing system which may be readily maneuvered in the vicinity of towers supporting energized voltage transmission lines to facilitate positioning of a washing boom among the energized components of the transmission tower.

Another objective this instant invention is to provide an insulator spray washing system which is efficient and cost effective.

It is still another objective of this invention to provide an insulator spray washing system which can operate over long distances over otherwise inaccessible terrain.

It is another object of this invention to provide an insulator spray washing system which can economically compete with traditional systems for washing insulators.

It is another object of this invention to provide an insulator spray washing system which can be dispatched worldwide economically and rapidly.

In accordance with these and other objectives which will be apparent hereinafter, the instant invention will now be described with particular reference to the accompanying drawings.

DESCRIPTION OF THE PREFERRED EMBODIMENT

Figure 1:
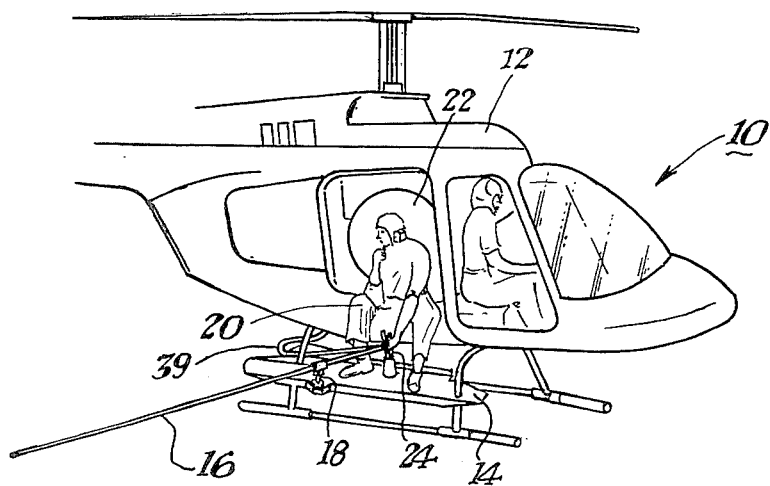
FIG. 1 is a perspective view of the present invention.

Referring now in detail to the drawings and in particular to FIG. 1, there is shown a perspective view of the airborne insulator spray cleaning system, generally designated as numeral 10. An airborne platform 12, such as a helicopter, balloon or other type of hover craft, provides a mobile, ungrounded, stable platform to support and maneuver a pressurized spray washing apparatus. A support frame 14 is attached to the helicopter to provide support for an articulated boom 16 which may be rotated about pivotal joint 18. An operator 20 seated on airborne platform 12 may articulate the boom through a wide range of motion to position the distal end adjacent to the insulator string. Fluid storage tank 22 is strapped to airborne platform 12 to provide an integral source of washing fluid. A grounding cable (not shown) connects the support frame 14 to the airborne platform 12 to provide electrical bonding. The pivotal joint 18 provides electrical bonding between the articulated boom 16 and the support frame 14. A spray control 24 is manipulated by operator 20 to regulate the volume and duration of the spray emitted from the nozzle of the articulated boom 16. Articulated boom 16 may be of any manageable length to facilitate placement of the nozzle adjacent to the insulator string.

Figure 2:
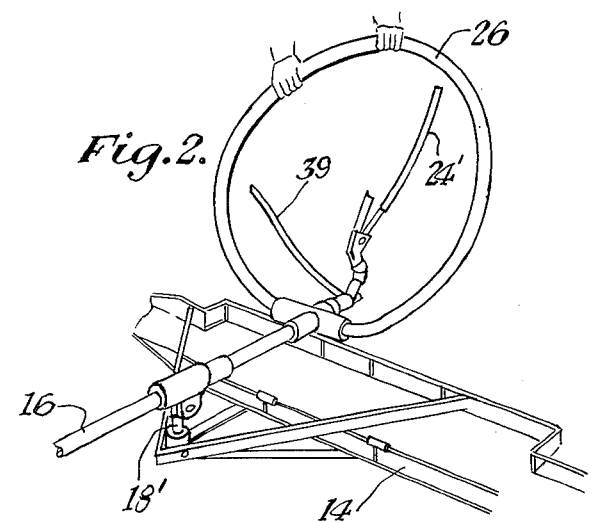
FIG. 2 is a perspective view of an alternative embodiment of the articulated boom.

FIG. 2 shows an alternative embodiment of the articulated boom 16 employing a counter-balance collar 26 or any similar device which compensates for the cantilevered effect of the length of the boom 16 beyond the pivotal joint 18 and facilitates maneuver of the boom 16. Such a device may include rack and pinion, motor driven or any other such device providing mechanical or dynamic leverage. A spray control handle 24' is provided to control the duration and volume of the spray fluid. The spray control handle may be manually or electrically operated. The spray control handle 24' facilitates simultaneous operation of the counter-balance collar 26 with the spray control handle 24'. Pivotal joint 18' may be a well-known gimballed pivoting device or any other similar device which allows articulation of the boom 16 about a fixed point.

Figure 3:
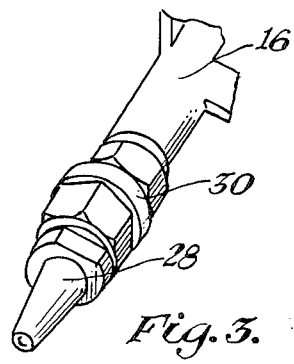
FIG. 3 is a perspective view of the spray nozzle of the instant invention.

FIG. 3 shows a spray nozzle 28 attached to the quick disconnect section 30 attached to the distal end of the articulated boom 16. The mechanical connection between spray nozzle 28, disconnect section 30 and articulated boom 16 provides electro-mechanical conductive bonding between the components.

Figure 4:
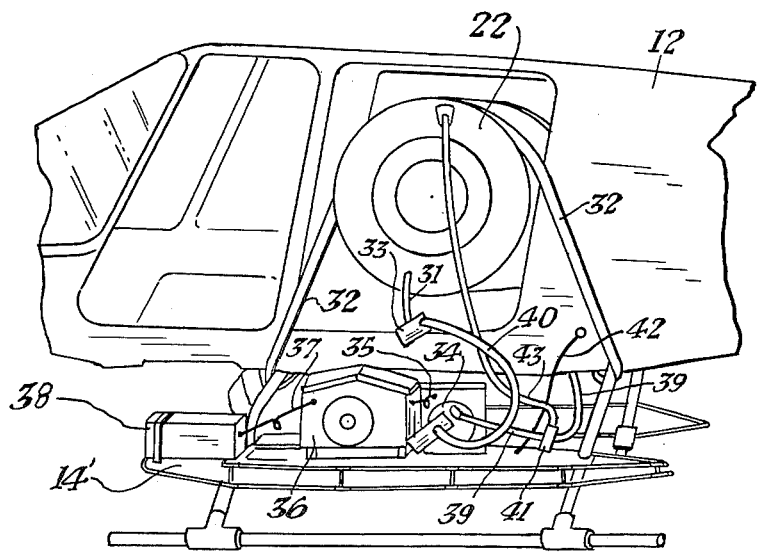
FIG. 4 is a perspective view of the pressurized spray washing apparatus of the instant invention.

FIG. 4 shows a perspective view of the pressurized spray working apparatus of the airborne insulator spray washing system 10. Fluid storage tank 22 provides a source of non-pressurized washing fluid aboard the airborne platform 12. A ground strap (not shown) in the bottom of the fluid storage tank 22 comes out of the top of tank 22 and attaches to ground strap 42. Straps 32 secures the tank 22 on the platform 12. Outlet hose 31 attached to the bottom of tank 22 provides fluid communication between tank 22 and filter 33 which filters the washing fluid before it enters pump 34. Hose 40 provides fluid communication between filter 33 and pump 34. Engine 36 propels pump 34 to pressurize the washing fluid. Fuel tank 38 stores fuel for engine 36. Fuel tank 38, engine 36 and pump 34 are attached, generally by metallic fasteners, to support frame 14', which is attached to platform 12, to provide support and attachment for these components. The metallic fasteners provide electro-mechanical conductive bonding between the components and the support frame 14' which is generally constructed of metal. Electro-conductive bonding is provided between fuel tank 38, engine 36 and pump 34 by bonding cables 35 and 37. Bonding cable 42 provides electro-conductive bonding between the support frame 14' and platform 12. Bonding cables 35, 37 and 42 are usually made of copper. Pump 34 provides pressurized washing fluid to boom hose 39 at 1000 p.s.i. (max) at the rate of 10 gal/minute. Interruptor 41 provides for diversion of the washing fluid from boom hose 39 into return hose 43 which channels the fluid back into tank 22 when spray control handle 24 or 24' is closed and pressurized water momentarily ceases to flow. Pump 34 continues to operate and the pressure causes the interruptor 41 to divert the water flow until the spray handle is activated and fluid flows through hose 39 to the boom.

Figure 5:
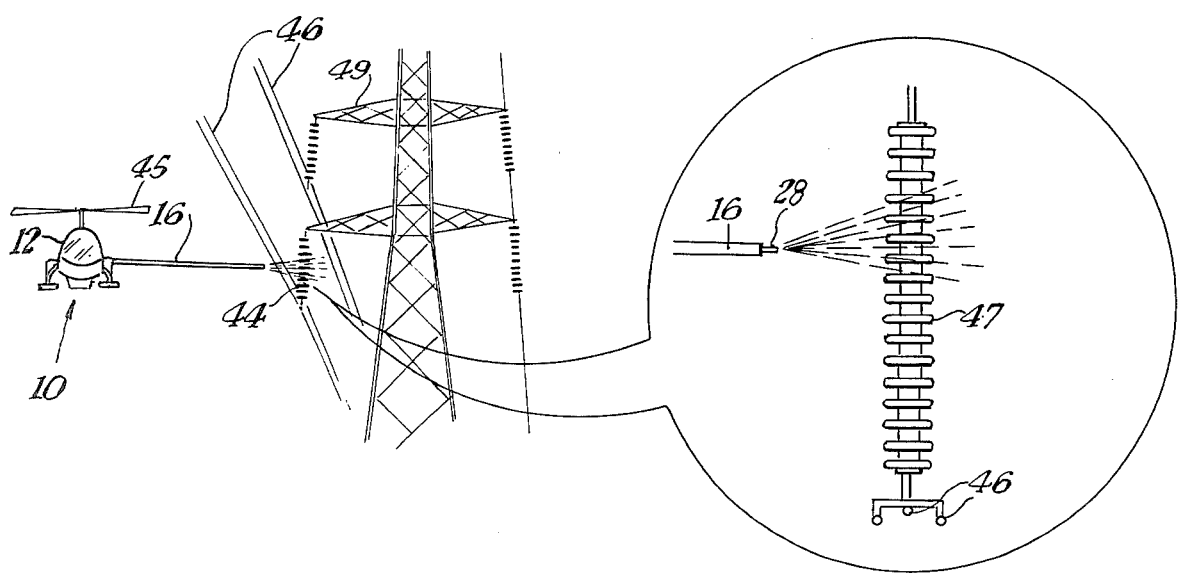
FIG. 5 is a perspective view of the airborne insulator spray washing system spraying a vertical insulator string.

FIG. 5 shows airborne insulator spray washing system 10 directing a stream of washing fluid onto an insulator string 44. The hovering capability allows airborne platform 12 to position adjacent to insulator string 44 so as to avoid contact or unsafe juxtaposition with other energized transmission conductors 46. The airborne platform 12 is hovered so that boom 16 is maneuvered into position taking advantage of wind conditions and the physical orientation and position of the stringer to direct a concentrated spray of washing fluid onto insulator string 44. As shown by the insert to FIG. 5 the tip of the boom 16 may come within inches of the insulator bell due to its ungrounded condition. An arcing of potentials may occur but a fault flash-over with its devastating current flow may not occur unless the platform 12 both touches the conductor 46 and comes within the flash-over stand-off distance required for that conductor to a grounded object, such as tower arm 49 or another conductor 46, or vice versa. The hovering capability of platform 12 generally allows it, except for the boom 16, to remain outside the stand-off distances. Generally the boom 16 will be of sufficient length to extend past the rotor blades 45 of platform 12. By extending beyond the rotor blades 45 the effect of rotor blast on the spray is minimized. The insert to FIG. 5 shows how the spray of nozzle cleans only a couple bells 47 at a time. The high pressure spray contours to the shape of the bell 47 for more efficient cleaning of the contaminants. In this manner the bells 47 may be cleaned without excessively wetting down the insulator string 44 or contacting conductor 46. Boom 16 may be built to telescope or compress and extend so as to further control the positioning of the nozzle in the vicinity of the energized transmission conductor 46.

Upon expenditure of the washing fluid in the storage tank 22 the airborne platform 12 may land and immediately refill. As each insulator string 44 is washed the airborne platform 12 may reposition to wash the next insulator string and maneuver the boom 16 to utilize prevailing winds for hovering and spray control and for avoiding contact or unsafe juxtaposition with other energized transmission lines.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method of washing contamination from insulation components of energized and non-energized voltage transmission lines, which comprises:

hovering an ungrounded washing apparatus in an airborne platform adjacent to said insulating components, maneuvering an articulating boom assembly of the washing apparatus into position adjacent to said insulating components inside the stand-off flash-over distances for grounded objects, pressurizing washing fluid within said washing apparatus on said airborne platform, spraying said pressurized washing fluid onto said insulation components from a nozzle mounted on the distal end of said boom in fluid communication with said washing apparatus, regulating the discharge of pressurized washing fluid from the nozzle of the boom assembly onto the insulation components.

* * * * *